United States Patent
Pandit et al.

(10) Patent No.: US 11,386,405 B2
(45) Date of Patent: Jul. 12, 2022

(54) DYNAMIC BLOCKCHAIN TRANSACTIONAL POLICY MANAGEMENT

(71) Applicant: International Business Machines Corporation, Armonk, NY (US)

(72) Inventors: Vinayaka Pandit, Bangalore (IN); Rishi Saket, Bangalore (IN); Kameshwaran Sampath, Bangalore (IN); Talha Ahmad Siddiqui, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 15/846,539

(22) Filed: Dec. 19, 2017

(65) Prior Publication Data

US 2019/0188655 A1    Jun. 20, 2019

(51) Int. Cl.
*G06Q 20/22* (2012.01)
*G06Q 20/40* (2012.01)
*G06Q 20/06* (2012.01)

(52) U.S. Cl.
CPC ......... *G06Q 20/065* (2013.01); *G06Q 20/223* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 2012/0310831 A1 | 12/2012 | Harris et al. | |
| 2016/0260169 A1* | 9/2016 | Arnold | G06Q 40/12 |
| 2016/0335533 A1 | 11/2016 | Davis et al. | |
| 2017/0046652 A1* | 2/2017 | Haldenby | G06Q 20/0655 |
| 2017/0098291 A1 | 4/2017 | Code et al. | |
| 2017/0132626 A1* | 5/2017 | Kennedy | G06Q 20/401 |
| 2017/0132630 A1* | 5/2017 | Castinado | G06Q 20/4014 |
| 2017/0140408 A1 | 5/2017 | Wuehler | |
| 2018/0082024 A1* | 3/2018 | Curbera | H04L 9/3236 |

(Continued)

FOREIGN PATENT DOCUMENTS

WO    2017098519 A1    6/2017
WO    WO-2019005098 A1 *  1/2019  ......... G06F 21/6227

OTHER PUBLICATIONS

Outchakoucht et al., "Dynamic Access Control Policy based on Blockchain and Machine Learning for the Internet of Things", International Journal of Advanced Computer Science and Applications, vol. 8, No. 7, 2017. (Year: 2017).*

(Continued)

*Primary Examiner* — Neha Patel
*Assistant Examiner* — Clay C Lee

(57) ABSTRACT

An example operation may include one or more of receiving a request to execute a blockchain transaction from a user device that is associated with a user account, determining whether to perform the blockchain transaction based on a dynamic participation policy of the user account, the dynamic participation policy being dynamically determined based on previous blockchain transactions of one or more of the user account and of other user accounts, and, in response to determining to perform the blockchain transaction, executing the blockchain transaction on behalf of the user account via a smart contract and storing information about the executed blockchain transaction.

14 Claims, 6 Drawing Sheets

(56) References Cited

U.S. PATENT DOCUMENTS

| | | | |
|---|---|---|---|
| 2019/0042620 A1* | 2/2019 | Garagiola | G06F 16/2453 |
| 2019/0073666 A1* | 3/2019 | Ortiz | H04L 9/3236 |
| 2019/0114182 A1* | 4/2019 | Chalakudi | H04L 9/3297 |
| 2019/0147505 A1* | 5/2019 | Blass | G06Q 20/10 |
| | | | 705/36 R |
| 2020/0067697 A1* | 2/2020 | Puddu | G06F 21/602 |
| 2020/0111092 A1* | 4/2020 | Wood | G06Q 40/06 |

OTHER PUBLICATIONS

S. Kamvar, D. Mario, T. Schlosser, & H. Garcia-Molina, The eigentrust algorithm for reputation management in p2p networks, Proceedings of the 12th international conference on World Wide Web, ACM. Retrieved from Internet using: http://ilpubs.stanford.edu:8090/562/1/2002-56.pdf.

K. Christidis, and M. Devetsikiotis, Blockchains and Smart Contracts for the Internet of Things,. IEEE Access, May 10, 2016, pp. 2292-2303. Retrieved from internet using: http://ieeexplore.ieee.org/stamp/stamp.jsp?arnumber=7467408.

A. Kosba, A. Miller, E. Shi, Z. Wen, and C. Papamanthou, Hawk: The Blockchain Model of Cryptography and Privacy-Preserving Smart Contracts, 2016 IEEE Symposium on Security and Privacy. Retrieved from internet using: http://download.xuebalib.com/xuebalib.com.27267.pdf.

Anonymously, System and Method for Aggregated Blockchain Credibility, ip.com Disclosure No. IPCOM000249067D Publication Date: Jan. 31, 2017.

\* cited by examiner

DYNAMIC BLOCKCHAIN TRANSACTIONAL POLICY MANAGEMENT

TECHNICAL FIELD

This application generally relates to managing blockchain transactions within a blockchain network, and more particularly, to dynamic blockchain transactional policy management.

BACKGROUND

A blockchain may be used as a public ledger to store information such as digital assets and the like. Because any individual or entity can often provide information to a blockchain, this information should be reviewed and confirmed. This operation is known as consensus. There are two types of consensus centralized and decentralized. Centralized consensus includes one central database that is used to rule transaction validity. A decentralized consensus transfers authority and trust to a decentralized network and enables its nodes to continuously and sequentially record their transactions on a public "block", creating a unique "chain" referred to as a blockchain. Cryptography, via hash codes, is used with a blockchain to secure an authentication of a transaction source and removes the need for a central intermediary.

A blockchain includes smart contracts that will execute when specified conditions of a transaction are met. Smart contracts are typically programmed to perform simple functions. For example, user A may agree to exchange digital assets to user B who in-turn bids to provide services (e.g., lending, healthcare, repair, etc.) to user A. The smart contract may verify that both user A and user B can fulfill their obligation (i.e., user A can provide digital assets and identify user B as being able to perform services) and execute a transaction on behalf of user A and user B thereby obligating both parties to legally perform their duties under the contract. Through the peer-to-peer distributed network, the blockchain allows for direct interaction between parties resulting in a truly decentralized sharing economy. However, in such a decentralized economy, users are not provided much information about other users. Therefore, a user entering into a contract through a blockchain transaction with another party may have very little information about the party they are contracting with.

SUMMARY

In one example embodiment, provided is a blockchain transaction processing method that includes one or more of receiving a request to execute a blockchain transaction from a user device that is associated with a user account, determining whether to perform the blockchain transaction based on a dynamic participation policy of the user account, the dynamic participation policy being dynamically determined based on previous blockchain transactions of the user account, and in response to determining to perform the blockchain transaction, executing the blockchain transaction on behalf of the user account via a smart contract and storing the blockchain transaction.

In another example embodiment, provided is a blockchain computing system that includes one or more of a network interface configured to receive a request to execute a blockchain transaction from a user device that is associated with a user account, and a processor configured to determine whether to perform the blockchain transaction based on a dynamic participation policy of the user account, the dynamic participation policy being dynamically determined based on previous blockchain transactions of one or more of the user account and of other user accounts, and in response the determination of whether to perform the blockchain transaction, execute the blockchain transaction on behalf of the user account via a smart contract and store information about the executed blockchain transaction.

In another example embodiment, provided is a non-transitory computer readable medium having stored therein program instructions that when executed cause a computer to perform one or more of receiving a request to execute a blockchain transaction from a user device that is associated with a user account, determining whether to perform the blockchain transaction based on a dynamic participation policy of the user account, the dynamic participation policy being dynamically determined based on previous blockchain transactions of one or more of the user account and of other user accounts, and in response to determining to perform the blockchain transaction, executing the blockchain transaction on behalf of the user account via a smart contract and storing the transaction on the blockchain.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

DETAILED DESCRIPTION

Figure 1:
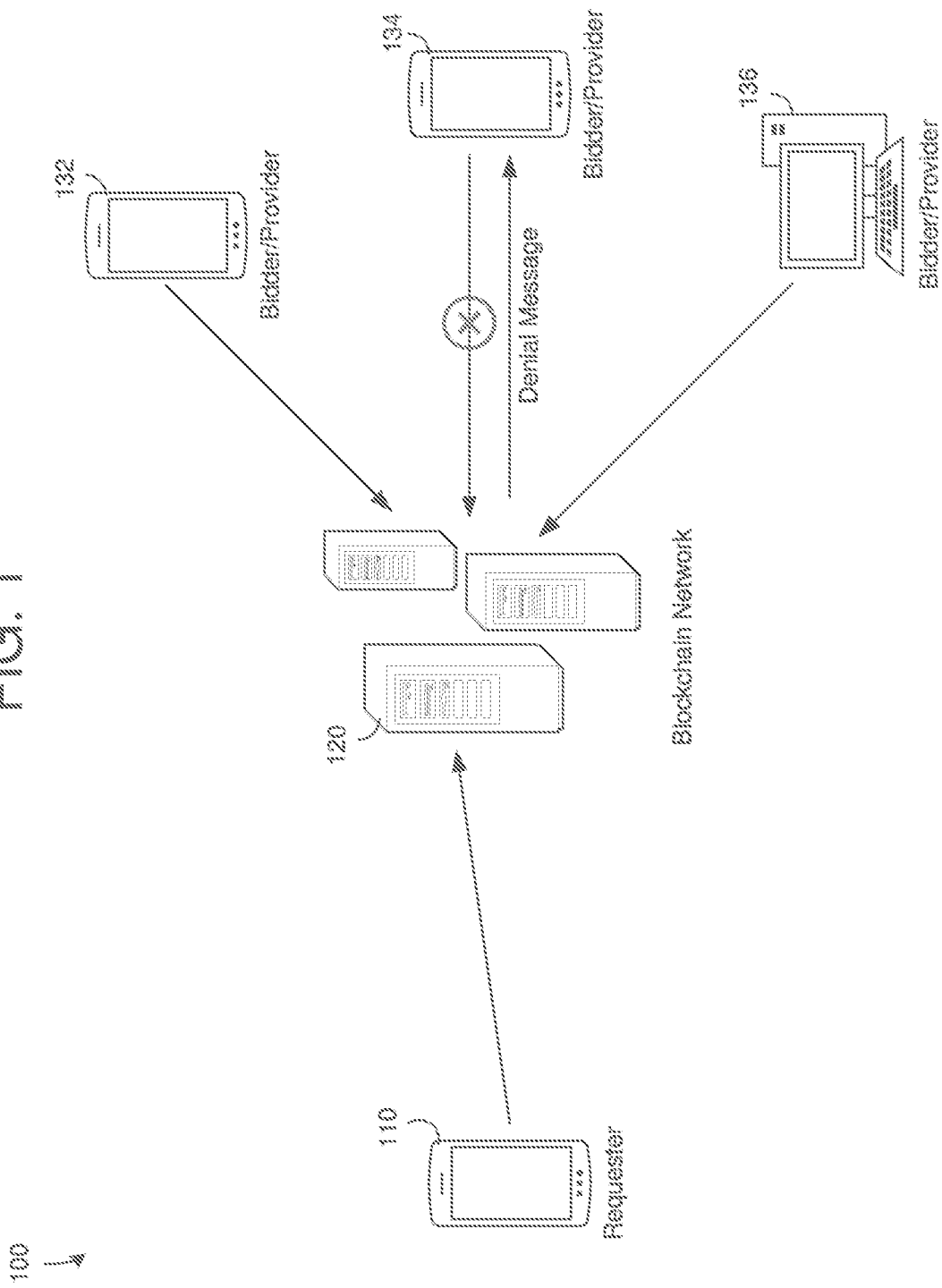
FIG. 1 is a diagram illustrating a blockchain network managing a participation policy in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to blockchain transactions, and in another embodiment relates to a software program and blockchain peer which manage a dynamic participation policy for a user account for transacting on a blockchain. The attributes of the dynamic participation policy may be determined based on a behavior (e.g., contract performance characteristics) of a user or entity associated with the user account during previous contracts entered into via the blockchain. The participation policy is unique to the user account (or a group of user accounts) and can be modified or updated over time based on activity/behavior of the user account thereby making the participation policy dynamic. As described herein a user account may refer to an individual, a company, an organization, or the like.

In operation, a user (via a user account) may attempt to enter into an agreement via the blockchain. For example, the user may attempt to bid on a services contract (e.g., legal services, financial services, repair/maintenance services, labor services, etc.) or enter another transaction such as a purchase/sale, an exchange of assets, and the like. The transaction may be managed via the blockchain. A blockchain peer associated with the blockchain may receive the request, and execute a participation policy of the user to determine whether to permit or otherwise allow the user to participate in the transaction. For example, the participation policy may determine whether to allow the user account to bid on the services contract based on prior service contracts performed by the user of the user account. The prior transactions may include content about the user account and the performance of the user with respect to their obligations under the contract. The content may include comments from other parties, user reviews, approval ratings, job completion status, timeliness of the performance, a quality of the performance, mitigating factors, and the like, which can be used by the participation policy program to dynamically determine whether to allow the user to participate in a new transaction associated with a similar contract for services (or other actions).

As described herein, a participation policy is a description of the ability of entities to execute smart contracts for blockchain transactions. The participation policy may be dynamic and may depend on previously blockchain transactions through a deterministic pre-defined, automated logic capturing the behavior of entities. When an entity has never conducted a transaction on the blockchain, they may have an initial predefined participation policy that is based on the type of entity, as well as other factors. However, as the entity transacts via the blockchain and a behavior of the entity with respect to contract performance is obtained, the participation policy of the entity may be changed dynamically based on the behavior. That is, the blockchain system may provide access-control based on transactional business behavior, not just an identity of the entity. The business behavior may be learned from attributes of the work or contract obligations performed (or not performed).

For example, previous executions of multiple smart contracts related to a user account and the performance characteristics for the user account in performing those contracts may determine a participation policy for the user account with respect to a new smart contract request. As a non-limiting example, company A's blockchain transactions with Banks F and G may influence its ability to execute a blockchain transaction with Bank H based on performance/behavior of the underlying contract managed by the blockchain. According to various aspects, the dynamic participation policy may be implemented as a program at peer level (i.e., a blockchain peer device) outside and separate of the smart contract logic, enabling flexibility for policy change. In addition, the blockchain distributed nature may ensure that the policy is consistent and replicated across all blockchain peers in the blockchain network each time the policy is modified. Furthermore, the evaluation of the participation policy does not alter the ledger and does not involve executing any smart contract.

FIG. 1 illustrates a blockchain network 100 managing a participation policy in accordance with an example embodiment. In this example, a requesting user 110 is requesting to have services performed and submitting the request to a blockchain network 120 which includes a plurality of blockchain peers connected to each other in a distributed network (e.g., peer-to-peer network, etc.) In response, a plurality of bidders associated with a plurality of user accounts 132, 134, and 136 attempt to bid on the opportunity to contract with the requesting user 110 to perform duties/services on behalf of the requesting user 110. In this example, the blockchain network 120 may determine whether to allow the user accounts 132, 134, and 136 to bid on the services contract based on respective dynamic participation policies managed by the blockchain network 120 for each of the respective user accounts 132, 134, and 136.

According to various aspects, the blockchain network 100 may implement a participation policy program which is stored on each blockchain peer in the blockchain network 100. The participation policy program may dynamically determine participation policy attributes (e.g., rules and abilities) for a user account when interacting with the blockchain. The dynamically determined participation policy may be based on quality of performance and other behavior characteristics of a user associated with the user account when performing previous contracts entered into through the blockchain network 120. The performance and behavior of the user may be determined from other user's posting reviews, whether performance was completed, whether performance was timely, quality of the performance, mitigating factors for the performance not being satisfactory, and the like. These factors may be provided from other user account, authorities, the user account in question, and the like.

In the example of FIG. 1, the blockchain network 120 determines to allow two bidders (i.e., user account 132 and user account 136) to participate in the service bidding process based on dynamic participation policies for each of the respective user accounts 132 and 136. However, in this example, user account 134 is prevented from bidding on the contract (and therefore prevented from executing a smart contract) due to a dynamic participation policy of the user account 134 which is determined dynamically by the blockchain network 120. Here, the blockchain network 120 may generate a denial message and transmit the denial message to the user device of the user account 134 indicating that the user account has been denied from participating in the bidding process. In some embodiments, the blockchain network 120 may also generate a reason for denying the participation and include the reason within the denial message. The reason may identify previous contracts of the user account 134 that are unsatisfactory, late, or incomplete, as well as identify user comments/reviews provided with respect to the previous contracts.

According to various aspects, a participation policy in the blockchain network 120 defines the ability of entities (e.g., user accounts 132, 134, and 136) to execute smart contracts via the blockchain network. The policy depends on previously executed transactions executed on the blockchain through a deterministic well-defined logic capturing the behavior of entities. For example, the policy may be dynamically determined based on previous blockchain transactions (i.e., smart contract executions) executed for the user account that is attempting to execute the smart contract to conduct the blockchain transaction. As another example, the policy may be dynamically determined based on previous blockchain transactions executed for one or more different user accounts. As another example, the policy may be dynamically determined based on previous blockchain transactions of the user account and previous blockchain transactions of one or more other user accounts. The dynamically determining may be based on previous transactions executed by the same smart contract of the current transaction, one or more different smart contracts, or a combination thereof. The policy rules are dynamic and not hardcoded into the smart contract, and the evaluation of the policy does not alter the world state and does not involve executing any smart contract.

As one example, consider a government health service running a blockchain network that enables hospitals and other entities (user accounts) to bid for offering medical services, and which assigns medical services requests (i.e. patients) to appropriate hospitals. In this example, if the performance of previous contracts entered into by Hospital A is poor, Hospital A may be barred from the bidding process for future patients at least for a predetermined amount of time. In this example, a participation policy of Hospital A that is dynamically determined by the blockchain network may not allow Hospital A to execute a smart contract required to participate in the bidding process. This could continue until a separate smart contract transaction, for example by the network administrator, revokes the barred status of Hospital A.

The dynamic participation restriction is useful because it is well defined and automated. The policy logic captures the business behavior of entities on the blockchain network and automatically regulates their access to smart contracts depending on their behavior. This automation removes inefficiency and subjectivity of external decision making. In addition, there can be multiple blockchain peers within the blockchain network which regulate access to users/entities submitting smart contract transactions. Each peer can maintain a copy of the same policy program which resides outside of the smart contract layer. A user/entity submits a transaction to a blockchain peer which receives the transaction. Based on the current state of the policy program located at the blockchain peer, the transaction is accepted/rejected for smart contract execution. The blockchain protocol guarantees that a particular transaction is always evaluated against the previous state of the ledger and the policy program, thus ensuring that the copies of the policy program at the different peers function identically with respect to a user that submitted a transaction.

Figure 2:
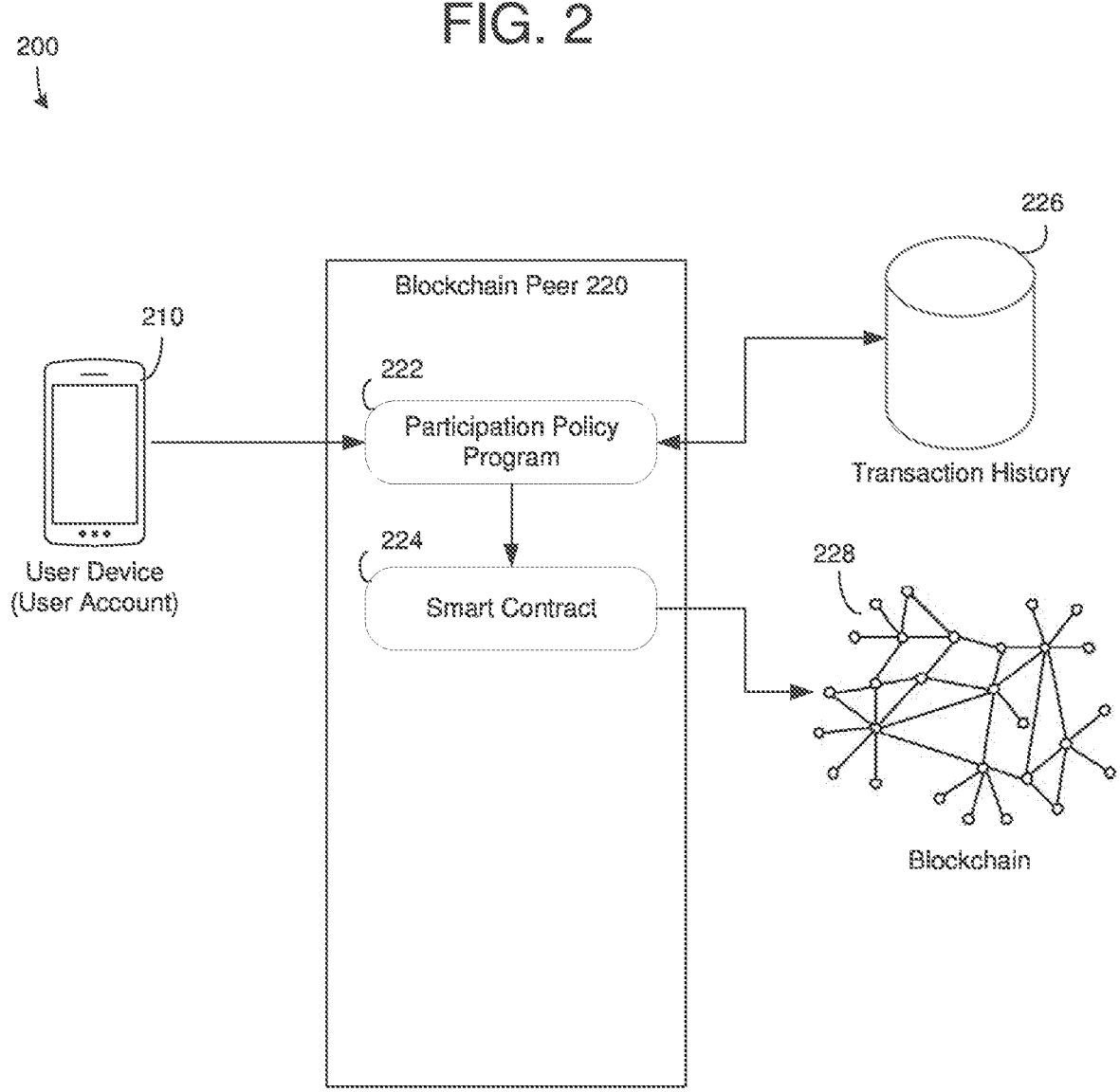
FIG. 2 is a diagram illustrating a process of determining whether to enable participation in a blockchain transaction based on a dynamic blockchain participation policy in accordance with an example embodiment.

FIG. 2 illustrates a process 200 of determining whether to enable participation in a blockchain transaction based on a dynamic blockchain participation policy in accordance with an example embodiment. Referring to FIG. 2, a user device 210 associated with a user account transmits a request to participate (i.e., execute) a blockchain transaction such as entering into a contract to provide goods, assets, services, or the like. In this example, a blockchain peer 220 receives the request and determines whether to permit/allow the user account to enter into the contract based on a dynamic participation policy of the user account with respect to a blockchain 228 managed by the blockchain peer 220.

In this example, the dynamic participation policy is managed by a participation policy program 222 executing on the blockchain peer 222 separate from a smart contract 224 which is also executing on the blockchain peer 220. The blockchain policy program 222 determines a behavior of the user account with respect to previous transactions executed on the blockchain based on historical data associated with the user account which is stored in a transaction history database 226. In this example, the transaction history database 226 and the blockchain 228 are local on the blockchain peer 220. However, in an alternative embodiment, one or more of the transaction history 226 and the blockchain 228 are remote. Also, in some embodiments, the transaction history database 226 and the blockchain 228 are the same but are simply shown separate for convenience of description.

A participation policy can be defined and evaluated for a user's access to any of the smart contract on the blockchain network by the participation policy program 222. For each user, the program 222 may maintain a profile which includes sets of allowed and/or disallowed smart contract executions based on the transaction history. The participation policy program 222 may maintain the user profiles based on historical smart contract transactions. A copy of the participation policy program 222 may perpetually execute on the blockchain peer 220 and may be connected to appropriate ports for capturing smart contract execution events. The participation policy program 222 may be updated on all peers together, and the updated policy may use the chain of previous transactions to ensure consistency across all peers. According to various embodiments, because the participation policy program 222 is not hard coded into any smart contract (e.g., smart contract 224) the update does not involve altering any of the registered smart contracts.

Given a set of peers running in a blockchain network including the blockchain peer 222, and a set of entities/users which submit smart contract transactions to the peers, the participation policy program 222 may be deployed (as identical copies) at each peer. For each user, depending on its identity the participation policy program 222 may initialize a profile for the user which defines the accessible smart contracts. As the different smart contract transactions take place on the blockchain over time, they are executed at each peer in the same order and based on this sequence the user profiles are updated by the policy program 222 at each peer identically. At any point in time there may be a plurality of registered smart contracts (including smart contract 224)

and participation policies defined for each one of them for each respective user account. For a new smart contract, the policy may be updated.

When the user 210 submits a transaction to the blockchain peer 220, the request is sent to the participation policy program 222 running at that blockchain peer 220 for acceptance/rejection. According to various aspects, the participation policy program 222 may determine whether to allow the user to conduct the new blockchain transaction based on the profile of the user developed based on previous history of blockchain transactions performed and stored in the transaction history database 226. This history may include transactions performed with other users as well, for example, enabling the participation program policy 222 to disallow a specific consumer from executing a smart contract with a second bank based on previous transactions of the user with a first bank that is separate from the second bank. In response to the participation policy program 222 determined to allow or accept the transaction, the transaction request is forwarded to the relevant smart contract 224 which executes the transaction and the resulting changes to the ledger are recorded on the blockchain 228. As another example, the transaction history database 226 may include transactions executed by one or more smart contracts for other users (or user accounts) other than the user attempting to execute the new transaction. In this example, the policy program may determine whether to allow the user to conduct a new blockchain transaction based on previous transactions executed by different users (e.g., enabling a bank to disallow a consumer from executing a smart contract based on previous behavior/smart contracts of other consumers).

As an example, a government health service may be running a blockchain network enabling hospitals to bid for offering medical services, and assigning medical services requests (i.e., patients) to appropriate hospitals. In this example, information about historical patient care of each hospital may be captured by and/or from previous smart contract executions which record outcomes and patient feedback in a transaction history database. If the patient care history for Hospital A is below a threshold level, it may be prevented from the bidding process for future patients with the participation policy program disallowing Hospital A from executing the smart contract required to participate in the bidding process.

As described herein, a smart contract is an executable code which is registered, stored, and replicated with a blockchain (e.g., distributed network of blockchain peers). A transaction is an execution of the smart contract code which can be performed in response to conditions associated with the smart contract being satisfied. The executing of the smart contract may trigger a trusted modification to a state of a digital blockchain ledger. The modification to the blockchain ledger caused by the smart contract execution may be automatically replicated throughout the distributed network of blockchain peers through one or more consensus protocols. In the example embodiments, output values (events) of the smart contract executions may be captured by the participation policy program at each peer and stored in a historical database.

Figure 3:
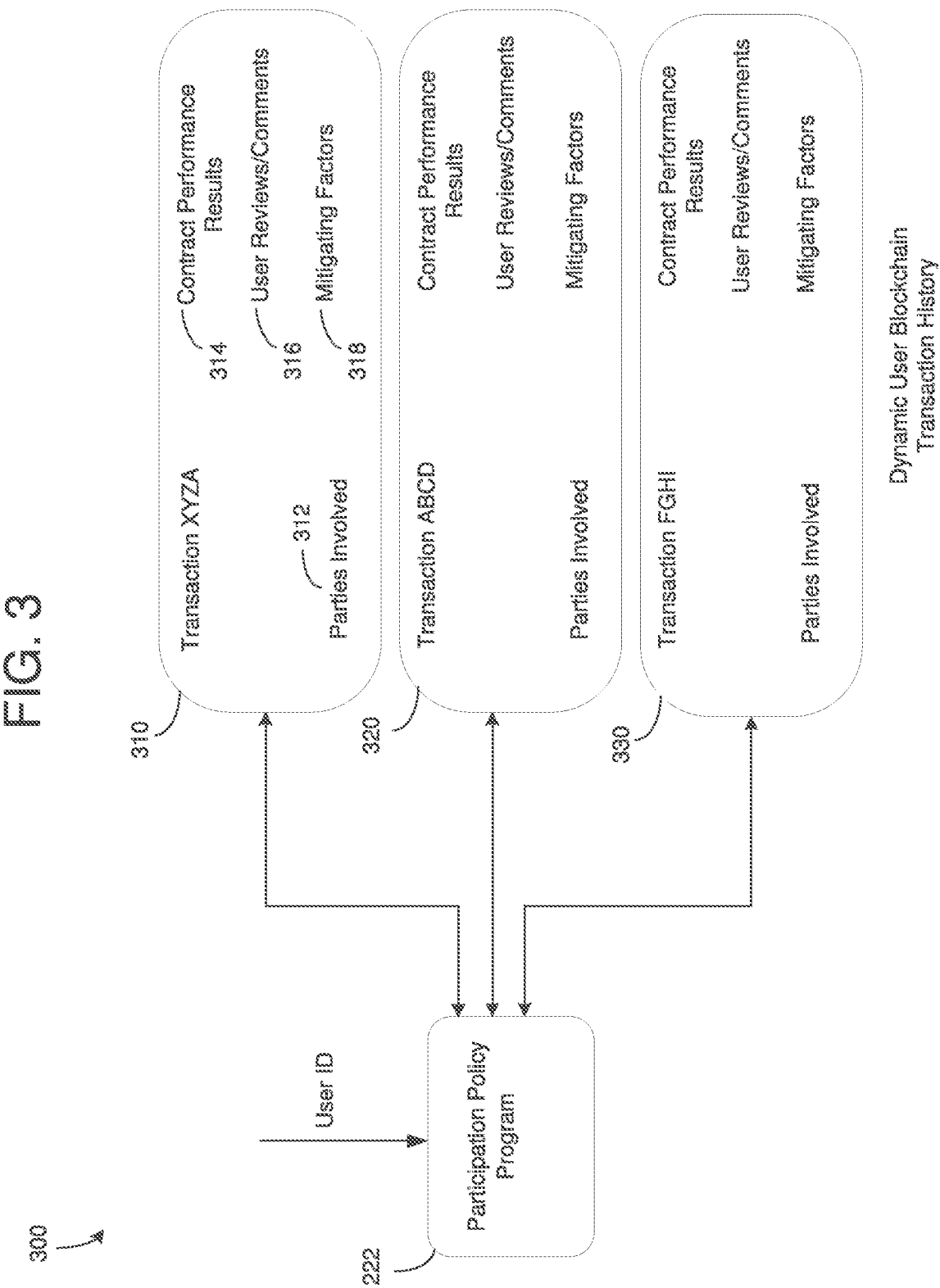
FIG. 3 is a diagram illustrating a process of dynamically modifying a blockchain transaction participation policy in accordance with an example embodiment.

FIG. 3 illustrates a process 300 of dynamically modifying a blockchain transaction participation policy based on previous blockchain transactions in accordance with an example embodiment. Referring to FIG. 3, the participation policy program 222 receives or otherwise analyzes previous blockchain transaction history of a user and other users to dynamically determine a participation policy for that user in executing a current smart contract. In this example, the participation policy program 222 may receive an identification of a user and may analyze content from a plurality of blockchain transactions 310, 320, and 330 associated with that user which provide information about a performance/behavior of the user in performing obligations under contract. The user identification may include a name, an email, an account number, a phone number, or any other identifiable information used to identify a user. Meanwhile, the content included in the previous blockchain transaction 310 may include an identification of the parties involved 312, contract performance results 314 (e.g., was task completed satisfactorily, etc.), user reviews/comments 316 (e.g., quality and timeliness feedback), mitigating factors 318 (e.g., reasons provided by the user for failing to perform adequately), and the like. It should be appreciated that this content is just for purposes of example, and any known content may be used to determine behavior of a user.

In some embodiments, different transactions (e.g., different user reviews) may have different weight given to their content based on their previous dealings/transactions with the blockchain. For example, a first user account may be more trusted (i.e., and therefore given a greater weight) due to factors such as length of transaction history with the blockchain, profile of the user (e.g., company vs. individual, etc.), user rating from other users, and the like.

Figure 4:
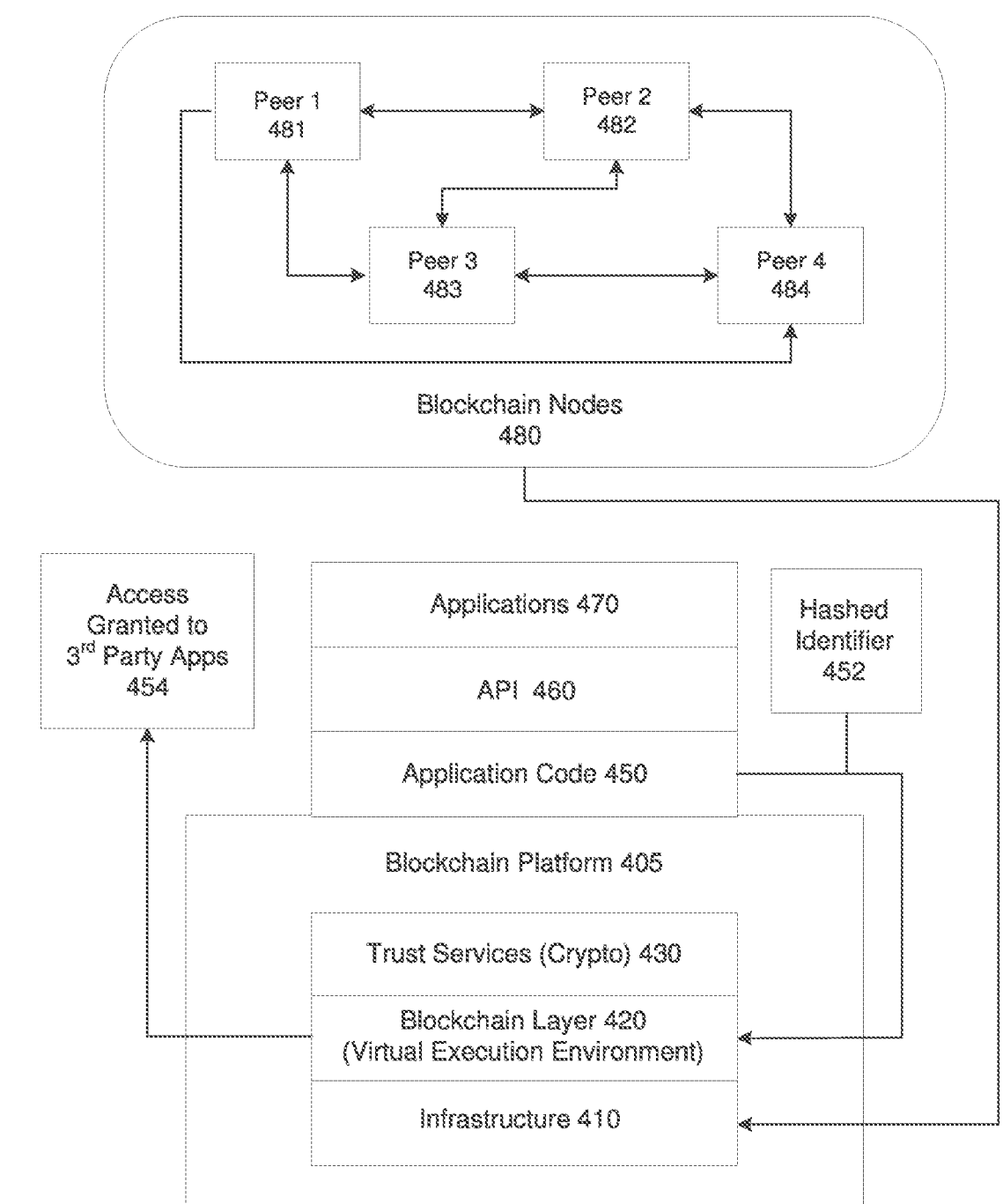
FIG. 4 is a diagram illustrating a blockchain system configuration in accordance with an example embodiment.

FIG. 4 illustrates a blockchain system database configuration, according to example embodiments. Referring to FIG. 4, blockchain system 400 may include certain common blockchain elements, for example, a group 480 of assigned peer blockchain nodes 481-484 which participate in blockchain transaction addition and validation process (consensus). As an example, the blockchain peers 120 shown in FIG. 1 may be the peer blockchain nodes 481-484, etc. Any of the blockchain peer nodes 480 may initiate a blockchain authentication and seek to write to a blockchain immutable ledger stored in blockchain layer 420, a copy of which may also be stored on the underpinning physical infrastructure 410. In this configuration, the customized blockchain configuration may include one or applications 470 which may include the participation policy program described herein. The applications 470 may be linked to application programming interfaces (APIs) 460 to access and execute or otherwise trigger stored program/application code (e.g., chain code and/or smart contracts) 450, which may be created according to the customized configuration sought by the participants and can maintain their own state, control its own assets, and receive external information. This code can be deployed as a transaction and installed, via appending to the distributed ledger, on all blockchain peer nodes.

The blockchain base or platform 405 may include various layers of blockchain data, services (e.g., cryptographic trust services, virtual execution environment), and underpinning physical computer infrastructure necessary to receive and store new transactions and provide access to auditors which are seeking to access data entries. The blockchain layer 420 may expose an interface that provides access to the virtual execution environment necessary to process the program code and engage the physical infrastructure 410. Cryptographic trust services 430 may be used to verify transactions such as asset exchange transactions and keep information private.

The blockchain configuration of FIG. 4 may process and execute program/application code 450 by way of one or more interfaces exposed, and services provided, by blockchain platform 405. The code may control blockchain assets. For example, the code can store and transfer data, and may be executed by the blockchain in the form of a smart contract and associated chain code with conditions or other code elements subject to its execution. The smart contracts 450 may be created to execute reminders, updates, and/or other notifications subject to the changes, updates, etc. The smart contracts can themselves be used to identify rules associated with authorization and access requirements and usage. For example, hashed identifier information 452 received from a user device may be processed by one or more processing entities (virtual machines) included in the blockchain layer 420. The result may include access being granted 454 to a third party application from the blockchain computing environment (VM). In this example, the previously known user identifiers or data template information may be stored in the blockchain platform 405. The physical machines 410 may be accessed to retrieve the user device template and the information can be used to match against incoming user identifiers for verification purposes.

Within chaincode, a smart contract may be created via a high-level application and programming language, then converted to a string that is written to a block in the blockchain. The smart contract may be invoked by a user device submitted operation or as further described herein, by the participation policy program determining to permit a user to execute a transaction on the blockchain based on a dynamic participation policy. The smart contract may write data to the blockchain in the format of key-value pairs. In addition, the smart contract may write information about the performance of the user with respect to their obligations under the contract. Here, the smart contract may store user reviews, approval ratings, timeliness (e.g., was the user late in fulfilling their duties, and if so, how late, etc.), job completion status, and the like.

Furthermore, the smart contract code can read the values stored in a blockchain (e.g., contract performance history) and process and output them for use in application operations such as the participation policy program. The smart contract code can write the output of various logic operations into the blockchain. The code may be used to create a temporary data structure in a virtual machine or other computing platform. Data written to the blockchain can be public or can be encrypted and maintained as private. The temporary data that is used/generated by the smart contract may be held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 5:
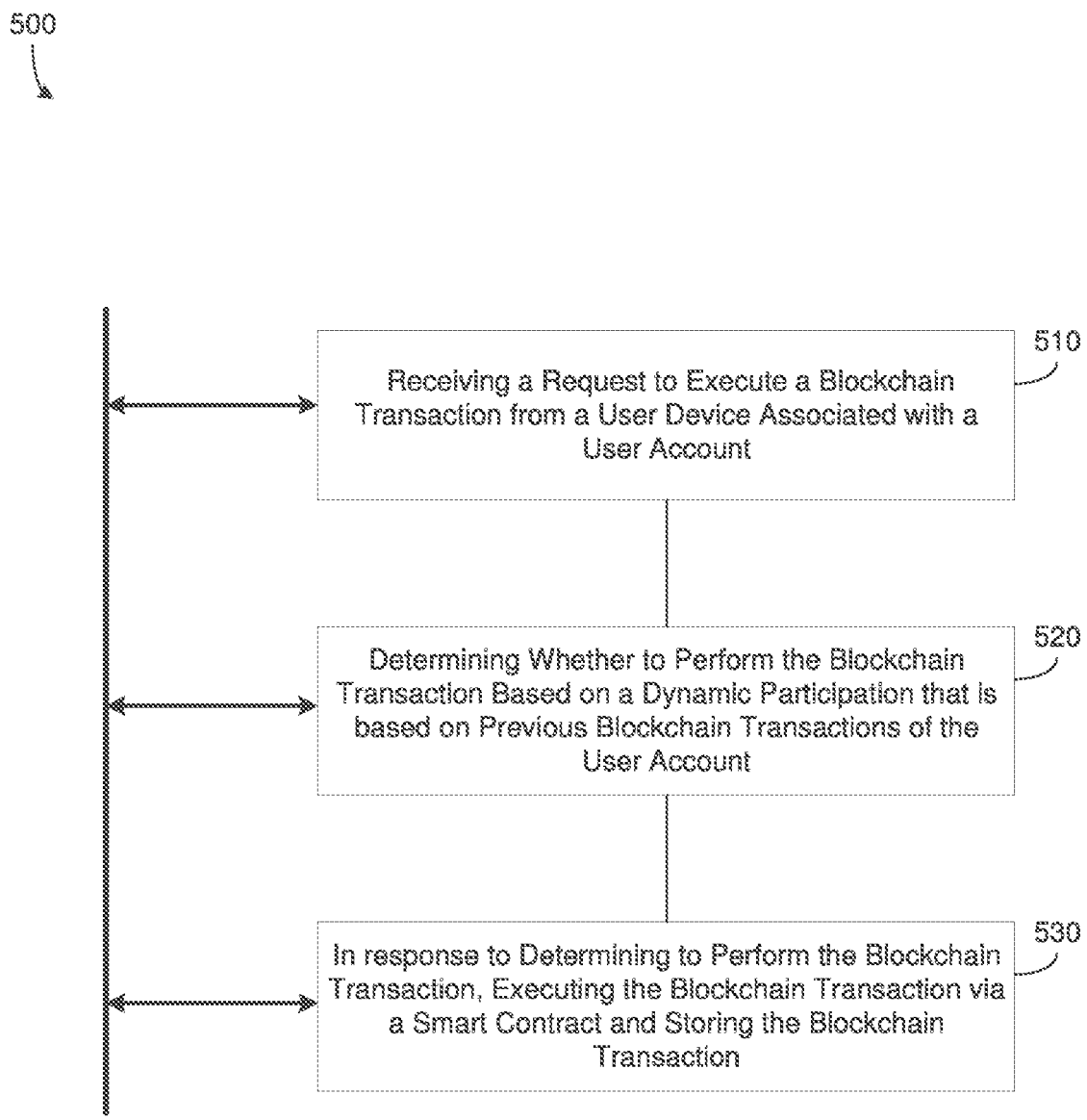
FIG. 5 is a diagram illustrating a method for managing a dynamic blockchain participation policy in accordance with an example embodiment.

FIG. 5 illustrates a method 500 for managing a dynamic blockchain participation policy in accordance with an example embodiment. For example, the method 500 may be performed by a computing device such as a blockchain peer, a server, a cloud platform, a workstation computer, a database, a user device, and the like. In 510, the method includes receiving a request to execute a blockchain transaction from a user device that is associated with a user account. The user account may be an account of an entity such as a user, a company, an organization, and the like. The user account may be identified by an email address, a digital wallet, a phone number, a username/password, and the like. The request may include a request to execute a blockchain transaction on behalf of the user account. As a non-limiting example, the requested blockchain transaction may be associated with a contract/transaction such as a purchase/sale contract, a bid to provide goods or services, an exchange transaction, and the like.

In 520, the method includes determining whether to perform the blockchain transaction based on a dynamic participation policy of the user account. According to various embodiments, the dynamic participation policy may be dynamically determined by a blockchain peer based on previous blockchain transactions. The dynamic participation policy may be updated or modified over time as contract performance behavior about a user or entity associated with the user account is determined or otherwise stored on the blockchain. For example, the participation policy may initially be set as a default participation policy when the user registers with the blockchain. However, the participation policy may be automatically updated by the blockchain network based on subsequent blockchain transactions. For example, the participation policy may be modified based on performance characteristics of the user in performing their obligations of the contract entered into via the previous blockchain transactions. The performance characteristics may be acquired from user reviews, job completion information, quality of performance, timeliness, mitigating reasons for failure to perform adequately, and the like. Accordingly, the dynamic participation policy may reflect the user's behavior in the performance of the previous contracts which are stored on the blockchain as transactions.

According to various embodiments, the dynamic participation policy may be used to define an ability of the user account to execute the smart contract, and the dynamic participation policy may be dynamically determined based on previous blockchain transactions executed by the smart contract and/or other smart contracts. Also, the dynamic participation policy may be managed and updated by the participation policy program which is separate and distinct from the smart contract. In some embodiments, the method may further include replicating the updated dynamic participation policy for the user account on one or more other blockchain peers that are within a blockchain network. In this example, the participation policy program may be implemented within all blockchain peers in the blockchain network. When a blockchain peer determines to modify a participation policy that is assigned to a user account, the modification to the user's account may be replicated on all blockchain peers similar to the replication performed for the blockchain itself.

In some embodiments, the modifying the dynamic participation policy may be based on content associated with the blockchain transaction and stored on the blockchain to generate an updated dynamic participation policy for the user account. For example, the content may include information that indicates a quality of performance of the user in the previous contracts of the previous blockchain transactions. The content may include user reviews, job completion status, ratings, timeliness, and the like. In some embodiments, user comments from the other user accounts may be weighted differently based on previous blockchain transactions of the respective other user accounts. For example, a first user account may be given a higher weight than a second user account when the first user account has a longer history on the blockchain, or the like.

In response to determining to perform the blockchain transaction, the method further includes executing the blockchain transaction on behalf of the user account via a smart contract and storing the blockchain transaction in a blockchain 530. The executing of the blockchain transaction may obligate the user account to perform duties with respect to the underlying contract associated with the blockchain transaction. Furthermore, the method may include updating the participation policy of the user account based on a performance of the user with respect to the underlying contract associated with the executed blockchain transaction. Although not shown in FIG. 5, in alternative embodiments, the method may include not performing the blockchain transaction for the user account based on the previous transactions associated with the user account and generating a denial message indicating that the blockchain transaction was denied. In some embodiments, the denial message may be transmitted to the user device of the user account. In some embodiments, the method may further include determining, based on the dynamic participation policy, a reason for denying the transaction and adding the determined reason for denying the transaction to the denial message.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
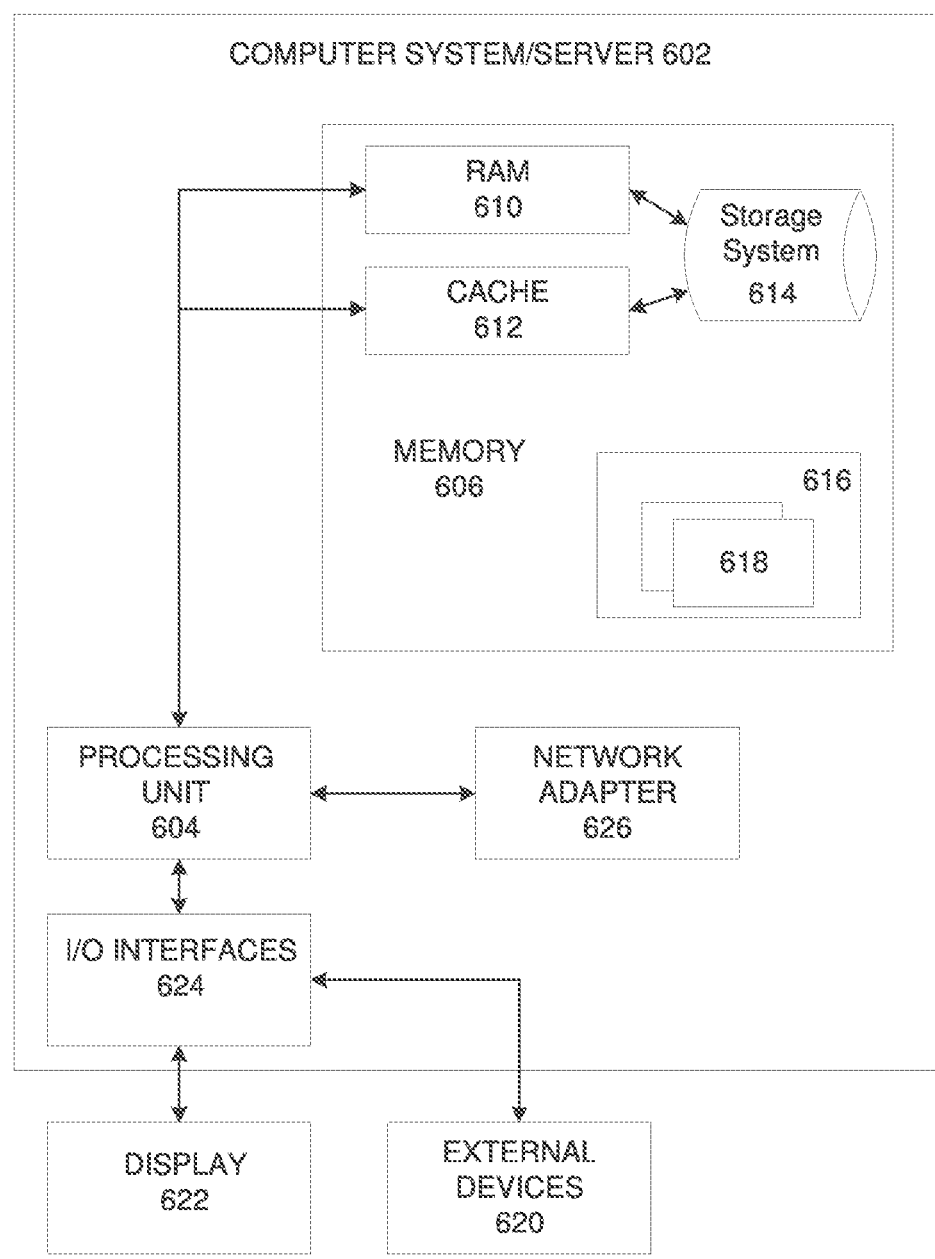
FIG. 6 is a diagram illustrating a blockchain computing system for managing a dynamic blockchain participation policy in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc. The computer system 600 may be a single device or a combination of devices. For example, the computer system 600 may be a blockchain node, a database, a server, a cloud platform, a network, a combination thereof, and the like.

FIG. 6 is not intended to suggest any limitation as to the scope of use or functionality of embodiments of the application described herein. Regardless, the computing system 600 (or node 600) is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in computing node 600 is shown in the form of a general-purpose computing device. The components of computer system/server 602 may include, but are not limited to, one or more processors or processing units 604 (i.e., processors), a system memory 606, and a bus that couples various system components including system memory 606 to processor 604. The computing node 600 may be a blockchain peer included in the blockchain network 120 shown in FIG. 1 or another device or combination of devices such as a server, cloud platform, database, and/or the like. Also, the computing node 600 may perform each of the method 500 shown in FIG. 5.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626 (also referred to as a network interface). As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The participation policy program described herein may be stored by the memory 606 and executed by the processor 604. According to various embodiments, the network interface 626 may receive a request to execute a blockchain transaction from a user device that is associated with a user account. The request may be received via a network such as the Internet, a private network, a combination thereof, and the like. The processor 604 may determine whether to perform (e.g., whether to permit, approve, authorize, etc.) the blockchain transaction based on a dynamic participation policy of the user account. According to various aspects, the dynamic participation policy may be dynamically determined based on previous blockchain transactions of one or more of the user account and of other user accounts. In response to determining to perform the blockchain transaction, the processor 604 may execute the blockchain transaction on behalf of the user account via a smart contract and store the blockchain transaction in a blockchain that is included in the memory 606 or another memory such as a local memory, remote memory, cloud memory, and the like.

According to various embodiments, the dynamic participation policy may be managed and updated by the participation policy program executed by the processor 604 and which is separate and distinct from the smart contract. Here, the logic included in the participation policy program may be exclusive from the logic included in the smart contract. In various embodiments, the processor 604 may modify the dynamic participation policy based on content included in the blockchain transaction executed on behalf of the user account to generate an updated dynamic participation policy for the user account. For example, the dynamic participation policy may be determined and/or modified by the processor 604 based on contract performance of the user in performing the duties of previous contracts executed via the blockchain. The contract performance may be identified from user comments associated with other user accounts included in the previous blockchain transactions. As another example, the contract performance may be identified from a timeliness of the contract, a completion status, mitigating factors in case the contract was not performed correctly or was late, and the like.

In some embodiments, the processor 604 may, in response to determining not to perform the blockchain transaction for the user account, generate a denial message indicating that the blockchain transaction was denied and control the network interface 626 to transmit the denial message to the user device of the user account. In this example, the processor 604 may determine, based on the dynamic participation policy, a reason for denying the transaction and add the determined reason for denying the transaction to the denial message.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by multiple types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored at different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A blockchain processing method, comprising:
   storing, via a software program on a blockchain peer from among a plurality of blockchain peers which manage a blockchain, a dynamic participation policy which identifies a set of chaincodes of the blockchain which are enabled for access by a user;
   identifying a blockchain transaction of the user executed via a chaincode from among the set of chaincodes that is stored on the blockchain and that is not timely completed by the user;
   automatically disabling access to the chaincode via the blockchain peer from among the set of chaincodes by modifying, via the software program, the dynamic participation policy on the blockchain peer to indicate that access to the chaincode is not allowed to be accessed by the user based on the identified blockchian transaction on the blockchain that is not timely completed by the user;
   modifying a plurality of dynamic participation policies on the plurality of blockchain peers to include a replication of the modification to the dynamic participation policy of the user, respectively, in response to the modification of the dynamic participation policy;
   receiving a new blockchain transaction from a user device associated with the user;
   determining, via the software program, that the new blockchain transaction includes a request to access the chaincode; and
   in response to the determination, preventing the user device from accessing the chaincode based on the modified dynamic participation policy and transmitting a denial message from the blockchain peer to the user that submitted the new blockchain transaction.

2. The blockchain processing method of claim 1, wherein the modifying further comprises modifying the set of chaincodes of the blockchain which the user is allowed to access based on performance reviews of previous blockchain transactions.

3. The blockchain processing method of claim 1, wherein the software program executing on the blockchain peer is decoupled from the set of chaincodes.

4. The blockchain processing method of claim 1, wherein the method further comprises determining quality of performance attributes of the user based on comments of other users included in previous blockchain transactions.

5. The blockchain processing method of claim 4, wherein the method further comprises determining to modify the set of chaincodes which are allowed to be accessed by the user based on the comments of other users, wherein comments from two of the other users are weighted differently based on previous blockchain transactions of the respective other users.

6. The blockchain processing method of claim 1, wherein the method further comprises determining a reason for disabling access to the chaincode and adding the determined reason to the denial message.

7. A blockchain computing system, comprising:
   a network interface configured to receive blockchain transactions from a user device that is associated with a user; and
   a processor configured to
      store, via a software program of a blockchain computing peer from among a plurality of blockchain peers which manage a blockchain, a dynamic participation policy which identifies a set of chaincodes of a blockchain which are enabled for access by the user;
      identify a blockchain transaction of the user executed via a chaincode from among the set of chaincodes that is stored on the blockchain and that is not timely completed by the user;
      automatically disable access to the chaincode via the blockchain peer from among the set of chaincodes by modifying, via the software program, the dynamic participation policy on the blockchain peer to indicate that access to the chaincode is not allowed to be accessed by the user based on the identified blockchain transaction on the blockchain that is not timely completed by the user;
      determine, via the software program, that a new blockchain transaction includes a request to access the chaincode; and
      in response to the determination, prevent the user device from accessing the chaincode based on the modified dynamic participation policy and transmitting a denial message from the blockchain peer to the user that submitted the new blockchain transaction.

8. The blockchain computing system of claim 7, wherein the processor is configured to modify the set of chaincodes of the blockchain which the user is allowed to access based on performance reviews of previous blockchain transactions.

9. The blockchain computing system of claim 7, wherein the software program is decoupled from the set of chaincodes.

10. The blockchain computing system of claim 7, wherein the processor is further configured to determine quality of performance attributes of the user based on comments associated with the user from other users included in previous blockchain transactions.

11. The blockchain computing system of claim 10, wherein the processor is further configured to determine whether to modify the set of chaincodes of the user based on the comments of other users, wherein comments from two of the other users are weighted differently by the processor based on previous blockchain transactions of the respective other users.

12. The blockchain computing system of claim 7, wherein the processor is further configured to determine a reason for disabling access to the chaincode and add the determined reason to the denial message.

13. A non-transitory computer readable medium having stored therein program instructions that when executed cause a computer to perform a blockchain processing method comprising:
    storing, via a software program on a blockchain peer from among a plurality of blockchain peers which manage a blockchain, a dynamic participation policy which identifies a set of chaincodes of the blockchain which are allowed to be accessed by a user;
    identifying a blockchain transaction executed via a chaincode from among the set of chaincodes that is stored on the blockchain and that is not timely completed by the user;
    automatically disabling access to the chaincode via the blockchain peer from among the set of chaincodes by modifying, via the software program, the dynamic participation policy on the blockchain peer to indicate that access to the chaincode is not allowed to be accessed by the user based on the identified blockchain transaction on the blockchain that is not timely completed by the user;
    modifying a plurality of dynamic participation policies on the plurality of blockchain peers to include a replication of the modification to the dynamic participation policy of the user, respectively, in response to the modification to the dynamic participation policy;
    receiving a new blockchain transaction from a user device that is associated with the user;
    determining, via the software program, that the new blockchain transaction includes a request to access the chaincode; and
    in response to the determination, preventing the user device from accessing the chaincode and transmitting a denial message from the blockchain peer to the user that submitted the blockchain request.

14. The non-transitory computer readable medium of claim 13, wherein the automatically modifying further comprises modifying the set of chaincodes of the blockchain which the user is allowed to access based on performance reviews of previous blockchain transactions.

* * * * *